United States Patent [19]

Roesel, Jr. et al.

[11] Patent Number: 4,600,873
[45] Date of Patent: Jul. 15, 1986

[54] SYNCHRONOUS A.C. MOTOR

[75] Inventors: John F. Roesel, Jr.; Ronnie J. Barber, both of Bradenton, Fla.

[73] Assignee: Precise Power Corporation, Bradenton, Fla.

[21] Appl. No.: 679,834

[22] Filed: Dec. 10, 1984

[51] Int. Cl.⁴ .............................................. H02P 5/28
[52] U.S. Cl. ............................ 318/701; 310/DIG. 2; 310/163; 318/705; 318/720; 318/729; 318/814
[58] Field of Search ............... 318/701, 705, 720, 729, 318/814; 310/156, 265, DIG. 2, 162, 163

[56] References Cited

U.S. PATENT DOCUMENTS 2,507,399  5/1950  Christensen ......................... 318/705
4,227,136 10/1980  Roesel, Jr. ........................... 318/701

Primary Examiner—David Smith, Jr.
Attorney, Agent, or Firm—Frederick Shapoe

[57] ABSTRACT

A synchronous A.C. electrical motor comprising (A) a stator having a body of slotted, soft ferromagnetic, low eddy current loss material, the slots having A.C. power windings to produce a rotating magnetic field, an excitation coil energizable with single phase A.C. located in two adjacent slots with a pole piece between them, and feedback windings located in slots such that when A.C. potential therefrom is conveyed to the excitation coil the excitation A.C. is modified to a selected phase and magnitude to improve the "pull in" torque of the motor, a capacitor containing circuit connecting the feedback windings and the excitation coil, the body of ferromagnetic material having a circular cylindrical surface, and (B) a rotor having three major components electrically and magnetically associated, (1) first being an exterior layer of a low electrical conductivity magnetizable permanent magnetic material having an outside cylindrical surface complementary to that of the stator, (2) a high permeability, low eddy current component to which the first layer is attached, and (3) the third component being a supporting body of ferromagnetic material of high permeability and high electrical conductivity on which the second component and first layer are fixedly supported. The third component can be a solid ring of steel, for example, or it can be a laminated core containing shorted electrical conductors. In starting from standstill, the power windings are energized with A.C. power and this produces a circulating electrical current with the third component of the rotor which reacts to produce rotational torque. After the rotor reaches about 70 to 80% of synchronous speed, the excitation coil is energized and this will produce strong alternating magnetic flux in the pole piece which magnetizes the layer of the permanent magnetic material into a pattern of north and south magnetic poles in the proper phase with the rotating field of the stator so as to produce a powerful rotational torque that accelerates the rotor to a predetermined synchronous speed.

15 Claims, 7 Drawing Figures

FIG I

SYNCHRONOUS A.C. MOTOR

BACKGROUND

A.C. electrical motors are widely used in commercial, industrial, domestic and other applications where rotating power is needed. The simplest and generally most reliable motors for most uses have been the A.C induction motors, a widely used form being known as squirrel cage motors. However, there are a number of well-known short-comings met with in such induction motors. Most A.C. induction motors will draw excessively high starting currents, usually from 5 to 7 times, and sometimes up to 9 times, the amperage drawn when at full load and at full operating speed. Even a small induction motor of a horsepower or so driving a saw or large appliance will cause the electric lights to dim in the place where it is being run due to the large current being drawn during starting, and such heavy current drain can cause blown fuses and produce other adverse results. Therefore, for larger capacity A.C. induction motors, above about 10 horsepower, for example, special starters, which often cost as much as the motor itself, are often required to reduce such excessively high amperage starting currents to acceptable levels though this reduces the starting torque also. Induction motors also have poor power factor characteristics and this creates power line problems. Because of their poor power factor at low speed, they have difficulty starting loads with high inertia without severe motor overheating. Induction motors by their nature have zero torque at synchronous speed. To develop torque they must operate at less than synchronous speed, i.e. at slip speed. The amount of such slip, (the difference in speed between the rotating magnetic field of the stator and the mechanical speed of the rotor) depends on the motor design and the load, typically being 2–5% in a modern motor. This results in a shaft speed that varies with load as well as causing substantial electrical losses and undesirable heating of the motor's electrical windings and rotor cage. High resistance rotors can be used to reduce starting inrush current but at a proportionally higher operating slip.

As defined and well understood in the art, synchronous speed, Ns, in RPM for an A.C. motor is given by the formula:

$$Ns = 120 \, f/p$$

where f is the A.C. frequency to the motor in cycles per second or Hertz (Hz), and p is the number of poles in the rotating magnetic field of the stator.

Conventional wound field synchronous motors operate at synchronous speeds, (zero slip), and can exhibit unity input power factor and higher efficiency than induction motors. They have the handicap of not being able to develop torque at any speed other than at synchronous speed and hence cannot start from standstill. In order to be able to start, modern synchronous motors usually have shorted windings in the rotor in an addition to the field windings on the poles. These shorted windings supply a starting torque much as in an induction motor to bring the machine to a speed close to synchronous. At this point the field windings are energized and the rotor of the synchronous motor is caused to pull into step with the rotating magnetic field of the stator. However, if the connected inertia of the load is higher than that which the motor can accelerate to synchronous speed in ½ cycle of input frequency, it will not synchronize and serious damage can result. This requirement severely limits the amount of inertial load that can be driven to synchronism by such a motor.

Permanent magnet synchronous motors have the same limitations as to inertial load, in addition to exhibiting a high pulsating torque as the motor approaches synchronous speed. Further, in order to allow space for an independent magnetic path for the squirrel cage windings required for starting and to avoid de-magnetization of the rotor permanent magnets during starting, the rotor structure of these permanent magnet synchronous motors is very complex and costly to manufacture when compared to a conventional squirrel cage induction motor or the motor of this invention.

Commercial permanent magnet synchronous motors are generally limited to sizes of 5 H.P. or less. Because of their high cost, in small sizes, commercial wound field synchronous motors are generally not manufactured in sizes less than about 50 to 100 H.P. It will be appreciated that a synchronous motor, either wound field or permanent magnet, is much more complex and several times more costly than an induction motor of similar capacity.

Under overload conditions a synchronous motor may drop out of synchronous speed and disastrous results may follow unless the input electrical power is immediately interrupted and/or the load dropped. When A.C. power from the power line is briefly interrupted, extremely high and damaging current surges can occur in a synchronous motor if attempts are made to restart it after the rotor field has drifted substantially out of phase with the A.C. line power.

In the art, small synchronous-induction motors known as hysteresis motors employing a solid rotor structure composed of a hardened steel or a similar easily magnetized permanent magnet material disposed over a non-magnetic core are built in small ratings. They can reach and operate at synchronous speeds, but due to their structure and reliance on hysteresis loss for their torque, they have such low torque that no substantial load for their size can be carried. Therefore their utility is primarily for such light loads as for operating clocks and small synchronous drive systems, usually of less than 1/10 Hp. Electrical handbooks list their power ratings as about 20 watts per pound of rotor.

There has been a long felt need for an A.C. electrical motor that can deliver continuous, substantial torque from standstill to a predetermined synchronous speed, being of simple low cost construction, having no brushes, commutators, or insulated rotor windings, that can start under substantial load without drawing more than roughly about 2 to 4 times the amperage drawn at full speed under full load, and without requiring costly starters so that they can be directly connected to a power line. Such motors should be able to easily reach synchronous speed regardless of the shaft and inertial loads reasonably applied to them within their rated capacity. A high electrical efficiency and substantially unity power factor under normal operating conditions would be desirable features for such electrical motors.

PRIOR ART

The following prior art is believed to be the most relevant know to the inventors with respect to the present invention:

1. U.S Pat. No. 4,227,136 entitled "Variable Speed A.C. Motor" issued on Oct. 7, 1980 to one of the inventors of the present invention. The most significant differences over this patent are that the present invention presents several novel components and features to enhance the operation of the motor as a fixed synchronous speed high performance motor. There are three electrically and magnetically associated components in the rotor of the present invention; a critical rotor component here is the third body of relatively high electrical conductivity and relatively high magnetic permeability while having a selected electrical resistance to transverse current flow. The motor of this earlier patent has only a layer of permanent magnetic material applied to the core of laminations of soft magnetic material in the rotor. Also, the layer of permanent magnetic material in the motor of this invention has special characteristics that allow significantly improved performance. Further, the stator of the present invention has feedback windings in selected locations in the stator core which function together with a capacitor circuit to modify the phase and amplitude of an A.C. current being concurrently generated in the excitation coil during operation of the motor, wherereby to control the rotor poles and hence optimize the torque of the motor as it approaches synchronous speed during starting, and 2. U.S. Pat. No. 4,168,459 entitled "Non-Interruptible Power Supply Systems" issued Sept. 18, 1970 to one of the present inventors. This patent relates to an induction motor driven motor-generator unit, and it only relates to a generator with modifying windings and supplementing windings which are of different design and their functioning is for different purposes than the feedback windings in the motor here.

SUMMARY OF THE INVENTION

The present invention provides a brushless and commutatorless A.C. motor of simple construction requiring no insulated rotating windings, that can be started from standstill while under a substantial shaft and/or inertial load, and brought up to synchronous speed without excessive temperature rise, and drawing not more than from about 2 to 4 times the full-load amperage. It can easily accelerate to synchronous speed inertial loads of as much as 50 times that of a comparativly rated conventional synchronous motor. The motor also exhibits very high electrical efficiency. The motor can be started directly from an A.C. power line without creating undesirable current surges. This motor can be easily controlled to operate at substantially a 100% power factor when desired. The motor can be designed to operate from either polyphase or single phase A.C. electrical power source at any reasonable frequency, and over a wide range of voltages.

The electrical A.C. motor of this invention comprises a rotor mounted on bearings providing a rotatable support therefor to which are attached three major components electrically and magnetically associated with each other. The first component is a layer of a high coercive force and low electrical conductivity magnetizable permanent magnetic material, such as a ferrite permanent magnetic material, this first layer has an exposed exterior surface preferably of circular cylindrical shape, though the surface may be broadly any surface of revolution coaxial with the axis of the rotor. The second component of the rotor is a layer of high permeability, low eddy current loss ferro-magnetic material with which the first layer is in close and fixed contact in order to independently provide a low reluctance magnetic path for at least a portion of the flux from the back face of the first layer. The third component of the rotor is a layer or annular member of a ferro-magnetic material of high permeability and relatively high conductivity in contact with and supporting the second component and having a selected electrical resistance to transverse flow of electrical currents. This third component may be of various physical construction. It may be a solid ring of soft steel, or other ferro-magnetic good conductor, or it may comprise a laminated stack of silicon-iron laminations with shorted conductors passing through the stack. Both the second and third components may be a stack of silicon-iron laminations, with a transversely spaced array of shorted buried solid conductors being spaced a distance away from the first layer.

The rotor may be of any configuration usable in electrical machines, for instance, (a) a low rotational inertia configuration such as is present in the conventional motor rotor, namly a circular cylinder with the outer surface being of a circular cylinder shape disposed within an encircling stator, or (b) of a high rotational inertia configuration where shaft ends supported on bearings are attached to a relatively large hollow cylindrical shell, of steel for example, which may be a portion of the third component, or with the third component being firmly attached to and being within the inner walls of the shell, the second component and the layer of magnetizable permanent magnet material are applied thereto to form an interior cylindrical surface. In all of these motor modifications, one rotor configuration may have a plurality of apertures or holes generally parallel to the axis of the rotor and transverse to the plane of the laminations passing through the stack of soft magnetic material and spaced a distance away from the first layer of permanent magnet material with electrical conductors disposed in the apertures or holes, these electrical conductors are shorted together at their ends and need not be insulated.

The stator of the motor preferably comprises a slotted body of low eddy current loss soft magnetic material of high permeability such as a stack of silicon steel laminations having a circular cylindrical surface juxtaposed with and substantially coextensive with the exterior exposed surface of the rotor and complementarily matching it, with a rotational clearance space between the two surfaces. Three different windings are placed in the stator slots. Most of the slots present in the body of soft magnetic material receive power windings comprising insulated electrical conductors, for driving the rotor, and these windings are arranged, in a well-known manner, to produce a rotating magnetic field about the rotor axis when energized with A.C. power. Also present in the stator's body of soft magnetic material is at least one pole piece, parallel to the rotor axis or, in some applications slightly skewed, with a relatively large slot on each side, in which large slots is placed an excitation coil energizable with single phase A.C., with a relatively narrow external face on the tip of the pole piece reaching a strong peak magnetic flux strength whose polarity alternates in accordance with the A.C. in the excitation coil. During rotation of the rotor, when the excitation coil is energized with A.C. the external face of the pole piece magnetizes the immediately adjacent portions of the passing layer of permanent magnetic material in the rotor to produce a pattern of north and south magnetic poles of a desired magnetic strength.

When the permanent magnetic material on the rotor is so magnetized into a configuration of north and south magnetic poles, as the rotor revolves these magnetic poles will in turn generate an A.C. potential within the excitation coil which is combined with the A.C. also induced therein by the rotating field of the main windings, and it is desirable to modify the magnitude and configuration of such generated A.C. to provide a selected magnitude and phase of the single phase A.C. Therefore a feedback winding is placed in the stator in a position to generate an A.C. potential to be supplied to the excitation coil, the combined A.C. thus present in the excitation coil being of a selected magnitude and at a desired phase displacement relative to the rotating field of the main windings. Resonant electrical circuit means, including a capacitor, are provided to improve the effectiveness of the combined A.C. potentials developed in the feedback windings and the excitation coil so as to modify the magnitude and phase relation of the A.C. current flowing in the excitation coil as a result of the emf developed by the rotor and induced from the main windings. Consequently the circuit to the excitation coil is self energized and requires no direct connection to the A.C. power supply. However, if desired, one of the phases of polyphase A.C. power to the power windings to the stator or taps on the stator windings may, in some applications, be employed to directly energize the excitation coil.

In specifying that the excitation coil is energized with single phase A.C. "having a selected magnitude and phase", it is desired that the single phase A.C. be of such a magnitude that the coil will produce a sufficiently strong magnetic field so that the tip or face of its associated pole piece develops the magnetic intensity necessary to drive the adjacent permanent magnet material essentially to its saturation point. In calling for the A.C. being of an "selected phase" it is meant that the magnetic polarity of the rotating layer so magnetized is closely aligned with the polarity of the rotating magnetic field of the stator, or at most lags only slightly, depending on the load applied. Thereby a north magnetic pole in the layer is substantially aligned with a south pole of the rotating magnetic field, and a south pole in the layer is substantially aligned with a north pole of the rotating magnetic field. This then provides an optimum attraction between these dissimilar poles thereby to produce the maximum torque on the rotor.

When the motor is energized with polyphase A.C., it is desirable in some applications to employ a number of excitation coils in the stator, the excitation coils being distributed about the circumference of the stator. Thus with a three phase A.C. power supply, for example, three excitation coils might be used, these coils being spaced 120 degrees apart, to secure better balanced line currents and obtain more torque per input ampere as the motor is coming up to synchronous speed. In other cases, a multiple of excitation coils per phase may be employed, for example, six excitation coils for a motor being connected to a three phase A.C. power line.

The sequence of events in bringing a two pole motor of the present invention from standstill to a synchronous speed, for example, 3600 RPM on a polyphase 60 Hz A.C. power source, is as follows: if the power windings are properly arranged they will provide a 2 pole rotating magnetic field which will then rotate at 3600 RPM. The turns, and voltage applied to the power windings, may be selected so that this rotating magnetic field produces lines of magnetic flux that magnetize and remagnetize the layer of permanent magnet material in the rotor into a succession of north and south poles of a desired strength thereby producing a hysteresis torque. Additionally, the lines of rotating magnetic flux will penetrate through the second rotor component comprising a body of soft magnetic material immediately below the layer of permanent magnetic material and will extend through into the third component, which may comprise either a solid annulus or a laminated core containing shorted electrical conductors. In its rotational movement the magnetic flux will cut through the shorted winding and cause an electrical current to flow in the shorted turns producing a torque much as in a conventional squirrel cage induction motor. Similary, the rotating magnetic field will induce electrical currents in a solid steel ring and a torque will be produced by reaction with the rotating field. The resistance of the shorted windings or the current induced in the solid annulus, determines to a large extent the starting amperage drawn by the power windings in the stator. Therefore the shorted winding or the solid annulus are designed of suitably selected materials and are of physical dimensions to have a sufficient resistance to transverse flow of electrical current so that the desired torque is developed while maximum amperage drawn during starting by the power windings of the stator normally does not exceed from about 2 to 4 times the amperage required to carry a full motor load at synchronous speed.

Within these constraints the motor of this invention ordinarily can be directly connected to the A.C. power line thus obviating need for costly starters. The motor will start and accelerate very smoothly and with a high torque so that a substantial load can be applied to the rotor right from standstill. Thus air fans and similar apparatus applying a small or moderate load at low speeds to the rotor can be directly coupled to the motor at all times. When the motor speed reaches the practical upper limit from its induction/hysteresis torque, about 75–80% of the synchronous speed typically, single phase A.C., which may be self generated by means of internal coupling of the feedback winding and the excitation coil, or either from the proper phase of the same power line that supplies polyphase A.C. power to the power windings of the stator, or by taps on these power windings, is applied to the excitation coil whereupon the associated pole piece will exert a strong alternating magnetic field, a substantial portion of which will pass through the layer of permanent magnet material and return to the stator through the second rotor component and the airgap. This will then magnetize the layer of permanent magnetic material on the rotor passing immediately adjacent to the exposed tip of the pole piece to essentially its magnetic saturation level so as to produce therein a succesive series of north and south magnetic poles. These magnetic poles are so positioned that they react strongly with the rotating magnetic field of the stator and will provide a very marked increase in rotational torque without drawing excessive A.C. currents and the rotor will accelerate with a continuous high torque to synchronous speed.

It is apparent that the torque produced by the shorted windings need only be sufficient to reach about 75–80% of full speed (20–25% slip), about 2700–2900 RPM in this example, therefore, much higher resistance rotor conductors can be used than would be practical in a conventional induction motor. This relatively high value of rotor resistance in the axial or transverse direction, when compared to that which can be practically employed in a conventional squirrel cage induction motor, significantly improves the rotor power factor at starting which thereby increases the torque produced relative to input line current. This torque together with the hysteresis torque produced dramatically increases the capacity of this motor to easily start high inertia loads such as centrifuges, rotary dryers, or flywheel energy storage systems, while maintaining low input current and modest temperature rise of the motor windings.

In order to further increase the acceleration of the rotor or to handle higher loads during starting, there may be taps on the power windings in the stator to reduce the number of windings being energized from the A.C. power line, thereby reducing the impedance of the windings and thus increasing the amperage being drawn and therefore increasing the torque being developed. A contactor or other switch means may be provided to connect or disconnect the A.C. power line to these taps at some predetermined speeds. When this is done the motor torque will increase substantially with, of course, an increase in the amperage being drawn but limited, if desired, to 2 to 4 times the full load running current. The rotor accelerates rapidly and smoothly to reach higher speeds. This modification is desirable for starting the motor while it is connected to a load that increases with the speed of the rotor, for example, centrifugal air and gas blowers, or loads which may require higher than normal starting torque such as reciprocating pumps or compressors.

The shorted windings in the rotor function primarily to assist the motor to start from standstill and reach intermediate speeds short of synchronous speed. At full synchronous speed they do not add to the torque of the motor except to reduce "hunting" under load changes. Consequently their design, number, and resistance are calculated primarily to provide the most efficient combination for starting purposes.

In order to visualize graphically the comparable torque-speed characteristics of induction motors, conventional synchronous motors, and those of the motor of this invention reference should be had to FIG. 1 of the drawings. Curve A is typical torque-speed curve for a conventional induction motor. When starting from standstill, the induction motor draws a very large amperage which, however, is considerably out of phase with the voltage applied so that only a moderate torque is produced, which torque value usually drops slightly during the first increment of rotational speed. As the rotor speed increases the power factor improves and the torque increases to a maximum value at about 70-80% of full running speed, at point V on the curve. The torque then drops rapidly from point V to its normal running value at point X. The point X is always a small but significant percentage short of the synchronous speed Y, the separation from X to Y being the rotor slip.

The usual conventional synchronous motor which has starting windings on the rotor which are basically limited capacity induction motor windings, when starting from standstill follows curve A down to point X. When point X in the rotor speed is reached, the regular field windings are energized with full amperage direct current and the rotor must accelerate from point X to point Y in one half cycle of the A.C. input frequency. At point Y the rotor is at synchronous speed and develops its full steady load torque. When overloaded, a synchronous motor will pull out of synchronism if the torque level exceeds that of point Z. The vertical line O–Z represents the torque curve of a synchronous motor with no shorted turns on the rotor.

It will be noted from these curves that neither the squirrel cage induction or synchronous permanent magnet or wound field, A.C. motor can operate to produce a steady torque within the triangular area defined by points X–O–Y.

The representative torque-speed curves for the motor of this invention are shown in curve B–F–H–D–Z, where the motor has no stator taps; while curve E–J–V–K–G, is for a stator provided with taps so as to secure higher starting torques up to point G. For the regular torque mode starting, the torque at starting can have the same value as for an induction motor, but the amperage drawn will be low as compared to an induction motor of equal rating. When the rotor reaches about 75–80% of synchronous speed at point F the excitation coils are energized with A.C. and the torque immediately increases markedly to a maximum value at H. As the rotor accelerates and the speed increases, the torque decreases along line D to torque Z at synchronous speed. The rotor reaches synchronous speed smoothly and easily. The motor of this invention can provide a substantial torgue at any point in the triangular area O–X–Y, and up to Z.

In the high acceleration torque mode, taps to the stator windings of the motor are employed to reduce the impedance of the stator power windings in order to provide higher starting torque. Curve E shows the greatly increased torque obtained when the taps are energized, so that very heavy loads can be accelerated. When point J speed is reached, the excitation coil is energized and the rotor torque increases to value V and as the rotor speed increases, the torque speed curve K is followed down to the synchronous speed point G. At this point G or at any point on line K, the input A.C. power is transfered to the full windings for normal operation, and its torque falls to a line D value.

Since at synchronous speed, and with the rotor not "hunting", the rotating magnetic field and the rotor are moving at an identical speed, the lines of magnetic flux of the rotating magnetic field are not cut by the shorted windings in the rotor, so that there is no current circulating therein and thus no electrical losses occur thereby. This motor therefore eliminates all the rotor winding losses encountered in conventional induction motors where slip must occur between the rotor and the rotating magnetic field in order to develop rotor torque.

Once synchronous speed is reached, theoretically there is no need for the exitation coil to be energized with A.C. so as to keep on magnetizing the layer of permanent magnetic material in the rotor since the pattern or configuration of north and south magnetic poles therein remains constant. In practice, to control hunting by the rotor which for example, arises due to abrupt changes in motor load, and to avoid problems arising from frequency variations in the A.C power line, the excitation coil preferably remains energized to some extent with single phase A.C. as long as the motor is functioning. Since only a small percentage of the total power to the motor is required by the excitation coil in this motor, this does not represent a significant power loss. In order to avoid some or even most of the loss of energy in keeping the excitation coil energized at all times once the motor reaches synchronous speed, electronic control means may be easily provided to supply the desired single phase A.C. to the excitation coil at, say, every 10th A.C. cycle, or either more or less frequently as circumstances dictate.

When at synchronous speed, the rotor has a set of essentialy permanent magnetic field poles rotating in phase with the rotating magnetic field produced by the stator power windings. The magnitude of the rotor field is usually set such that the back emf produced in the stator windings is essentially the same as the A.C. line potential applied to the stator input terminals. Under this condition no magnetizing current is required from the power line and the motor operates at the economically desirable unity power factor input.

Thus, the motor of the present invention is a potentially direct line-start motor, drawing unusually low amperage when starting, being able to start from standstill with a substantial inertial and shaft load and having a high torque so that it will accelerate while the motor is under such substantial loads, and with low temperature rise. It will accelerate smoothly with no difficulty so as to reach and lock into synchronous speed and will remain operating at synchronous speed regardless of all reasonable load variations. In addition the motor is of simple construction, highly efficient and meets or exceeds the efficiencies of even the best specially designed commercial high efficiency A.C. motors of similar ratings.

DRAWINGS

DETAILED DESCRIPTION OF THE INVENTION

Figure 1:
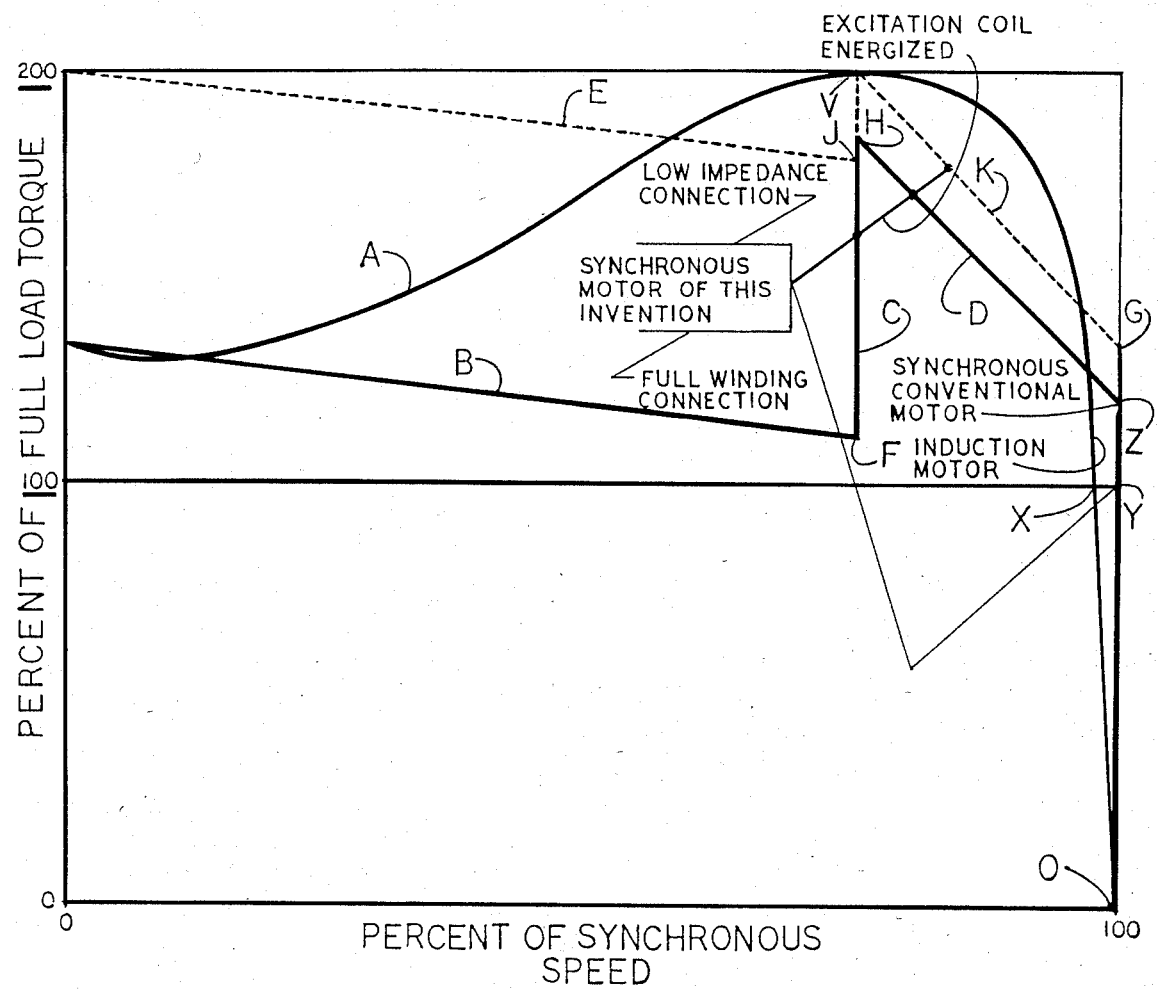
FIG. 1 is a graph plotting torque against speed.
Figure 2:
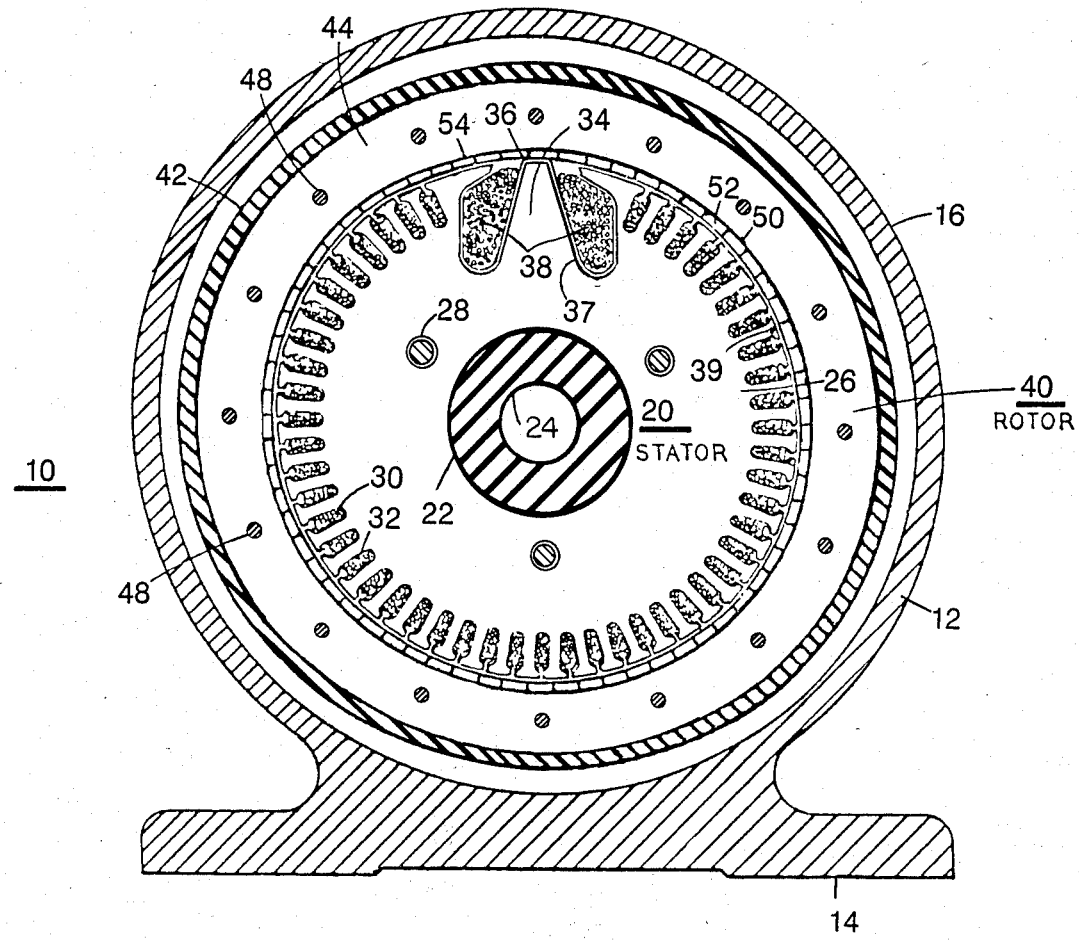
FIG. 2 is an axial cross-section of one form of a motor having high rotational inertia in accordance with the invention.

Referring to FIG. 2 of the drawing, the motor 10 comprises one form of the invention with a high rotational inertia rotor. The motor 10 comprises an outer supporting casing or frame 12 having mounting lugs 14, and having outer walls 16 providing a space within which is disposed a stator generally identified as 20. The stator 20 comprises a stationary tubular support 22 rigidly mounted on the casing or frame 12, and provided an internal hollow bore 24 through which electrical conductors can be introduced. Firmly mounted on support 22 is a body 26 of soft magnetic material, of high permeability and electrical resistance, such as a soft ferro-magnetic material or silicon-iron laminations in a stack clamped together by a plurality of bolts 28 each with an outer electrically insulating sleeve thereon. The body or stack of laminations 26, has a plurality of slots 30 arranged generally parallel to the axis of the motor about its periphery and within the slots are disposed power windings 32 so arranged as to produce a rotating magnetic field when the windings are energized with A.C. power. To provide an excitation coil, at one point on the periphery of the stack of laminations is a pole piece 34 with a relatively narrow outer pole face 36 and on either side of the pole piece are a pair of relatively large slots 37 within which is placed an excitation coil 38 capable of being energized with single phase A.C. so as to produce a strong alternating magnetic field in the pole piece so that it is alternately of north and south pole magnetism. The outer periphery surface 39 of the stator as shown is of a circular cylindrical configuration but it may be the shape of any surface of revolution having its axis generally at the center of the support 22. In selected slots 30, there also may be present feedback windings which are in a circuit with the excitation coil 38.

Circumposed about the stator 20 is a rotor 40 which may be mounted on bearings desirably fitted upon the tubular support 22. Rotatably disposed upon these bearings is a hollow cylindrical shell 42 within which is placed a body 44 of soft magnetic material such as a stack of laminations of silicon-iron for example, firmly attached to the walls of shell 42. A generally circular array of apertures passing completly through the stack 40 to allow buried electrical conductors 48, such as rods of steel, aluminum, copper or a copper alloy to pass through the entire stack and extending generally parallel to the axis of the rotor 40. These conductors 48 are shorted at their ends. The inner surface 50 of the body 44 is a circular cylindrical surface coaxial with the axis of the rotor, and attached thereto is a layer 52 of magnetizable permanent magnetic material, such as a ferrite, suitable examples thereof are barium ferrite, barium strontium ferrite, and strontium ferrite. The layer 52 may be adhesively bonded to the surface 50, with an epoxy resin or any other suitable bonding material. The layer 52 may comprise a plurality of small flat pieces of rectangular or of arcuate cross-sectional configuration having a radial thickness of from about 0.2 to 1.0 inch (0.5 cm to 2.54 cm). The exposed outer surface 54 of layer 52 should complementarily match and be coaxial with the surface 39 of the stator with a sufficient small clearance therebetween so that the surfaces will not touch as the rotor revolves.

In operating the motor 10, to bring the rotor 40 from standstill to synchronous speed, A.C. power from a utility line or other A.C. source can be directly connected to the power windings 32 so as to produce a rotating magnetic field extending from the circular surface 39 about the axis of the rotor. Three phase or two phase A.C. potential can be readily applied to the windings which are suitably arranged in well known manner to produce such rotating magnetic field. For small motors single phase A.C. can be used if separate portions of the windings are suitably designed. For example, one winding may be driven directly from the power line and a second winding displaced from the first and in series with a properly sized capacitor also driven from the power line thereto will cause a rotating magnetic field, being designed in accordance with practices also well known to the electrical art.

The magnetic flux from the rotating magnetic field penetrates into the layer 52 of magnetic material and may by design partly magnetize the layer and produce a magnetic torque to the rotor by a hysteresis effect.

Furthermore the magnetic flux passes into the soft magnetic body 44 and during its rotation is cut by the shorted conductors 48, thereby a substantial emf or electrical potential is generated therein, and results in a strong current flow in the shorted conductors 48 effective to produce a selected strong rotational torque on the rotor 40 by its reaction with the rotating magnetic field.

In the preferred embodiment of the present invention, it is important to select the number of conductors 48 and their electrical resistance so that the desired torque is produced and the current flow developed therein during starting does not cause the power windings 32 to draw more than about 2 to 4 times the amperage drawn when the rotor is at synchronous speed and pulling its rated load. When so arranged, the rotor can start while substantially loaded from a standstill condition and it will accelerate smoothly. If substantially more than this starting amperage were to be drawn relatively expensive motor starter equipment might be needed, while when the shorted windings are so designed that greatly less starting amperage than the 2 times value is drawn, the starting torque will be so small that a substantial load cannot be carried and the motor acceleration period would be inordinately prolonged. It should be understood, however, that if it is desired to accept a higher starting amperage at or above, say, 4 to 5 times the full load synchronous speed amperage in order to develop higher torque, the present motor construction still exhibits a number of substantial advantages over any prior art motor.

Once the motor's rotor 40 reaches about 75-80% of its synchronous speed, the excitation coil 38 is energized with single phase A.C. so that the pole piece 34 is magnetized to create a strong magnetic flux of alternate north and south polarity. A large portion of this flux, at speeds substantially below synchronous, passes through the layer 52 into the body 44 and a substantial portion returns between the buried conductors 48 and the surface 50 back through layer 52 to the stator surface 39. This results in substantially all of the entire layer 52 of magnetizable permanent magnetic material passing immediately adjacent to the pole face 36 during rotation of the rotor 40 being magnetized into a pattern or configuration of north and south magnetic poles. This pattern is changed or shifts during each revolution when the speed is not synchronous. The rotor is subjected to a substantial increase in torque when this pattern of layer magnetization takes place, since the magnetic poles in the layer 52 of magnetic material are located in phase relation to react most efficiently and effectively with the poles of the rotating magnetic field produced by the stator windings. The rotor will be accelerated to reach and lock into synchronous speed and will maintain such synchronous speed indefinitely under normal conditions regardless of reasonable load variations, including substantial overloads. The rotor smoothly and easily goes into synchronous speed at full torque as compared to the difficulty conventional synchronous motors have in making the critical jump in a half cycle from near synchronous speed to full synchronous speed.

In one prototype test application, involving a motor-generator unit, the moment of rotational inertia of the load to be started and accelerated to synchronous speed was about 240 pound-feet-squared. At full load and at synchronous speed the motor had to deliver 21 lb-ft. of load torque, and, in the event of a brief power interruption, the speed would drop from 3600 R.P.M. to 3150 R.P.M. while so loaded, and upon restoration of A.C. power the motor was able to restart immediately and accelerate back to full speed under full load. No reasonably sized commercial motor was available to meet these requirements. In fact NEMA guidelines suggested that a 300 horsepower induction motor was needed to meet these requirements. A 12 K.W. (16 H.P.) motor in accordance with this invention, having a construction as shown in FIG. 2, functioned most satisfactorily to meet all these requirements. The motor efficiency exceeded 90% and the normal power factor was approximately unity.

The energization of the excitation coil 38 after the rotor has reached a selected speed can be carried out manually by an operator having some indication of the speed, for instance from a meter or tachometer connected to the motor. However, the motor can be provided with an automaticaly operating mechanical centrifugal switch means placed on the rotor which can be set to function on reaching a pre-set speed of say 2700 to 3000 RPM for a 2 pole motor, or 1350 to 1500 RPM for a 4 pole motor, when energized with 60 Hz. A.C., to trip a switch which will convey the single phase A.C. to the excitation coil. Automatic centrifugal switches for switching purposes of a similar type are well known and widely used in single phase motors. Further there are a variety of electrically operable switching means, responsive to speed, usable to close the circuit to the excitation coil at any selected speed of the rotor, and to open the circuit when the rotor falls below such speed. For instance, a pick up coil on the stator can be energized by one or more cooperating small permanent magnets on the rotor end turn periphery, whereby the pick up coil generates an increasing voltage as the rotor speed increases and at a given voltage level a solid state switch will function to close a switch circuit to the excitation coil. Alternatively, frequency sensitive circuit means may be employed to close the excitation switch circuit in response to a predetermined output frequency from the pickup coil.

Once rotor 40 has reached synchronous speed, the layer 52 is fully magnetized into a generally unvarying polarity pattern, and it need not be changed at each revolution as was required when the rotor 40 was accelerating, assuming that the line A.C. to the motor does not change in frequency. Therefore the excitation could be deenergized, and the total motor efficiency will be increased. The excitation coil typically uses less that 3% of the total electrical power going to the motor and this percentage decreases further for motors of 10 K.W. and over.

However, if the load on the motor increases or decreases substantially, the spatial relation of a point of the rotating magnetic field to a given point the rotor will shift slightly as the rotor adjusts to a new torque angle. In adjusting to a new torque position the rotor may "overshoot" and, if the shorted turns in the rotor are unable to quickly damp this overshoot, "hunting" will result. In order to avoid such "hunting" effects which can take place under some conditions, and also the effects of frequency shifts or disturbances in the A.C. power line to the motor, it may be desirable to energize the excitation coil 38 with single phase A.C. at more or less regular intervals. Electronic controls and switches may be put in the circuit to the excitation coil 38, to re-energize it at a proper phase angle, for example, every 10th cycle for one or more cycles of A.C. so as to adjust the magnetization of layer 52, then the single phase A.C. to coil 38 is cut off for another few cycles. The excitation coil may also be energized in response to input current or power changes caused by "hunting" in such a manner as to reduce such hunting.

Figure 3:
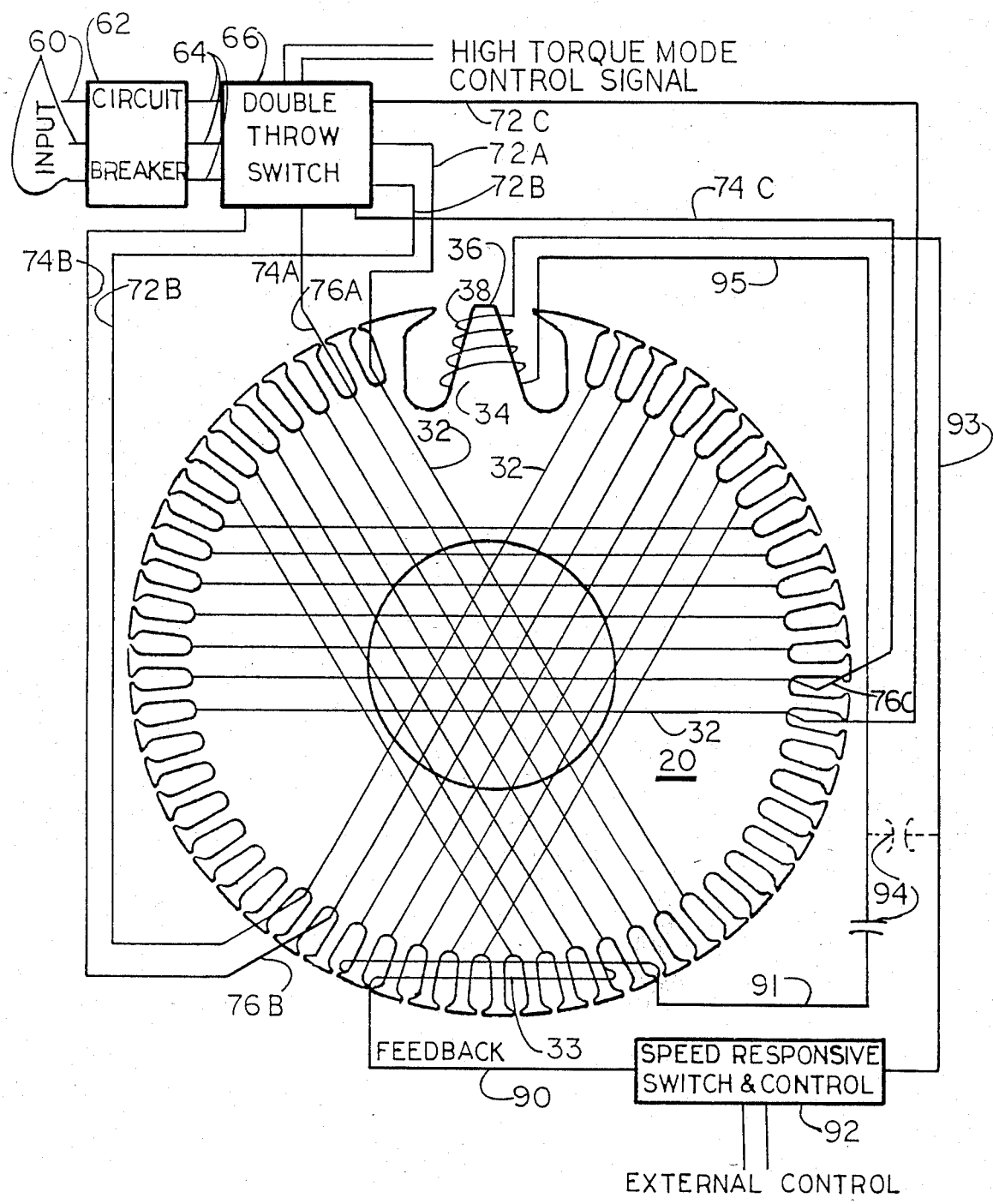
FIG. 3 is a schematic electrical circuit diagram of the motor.

Referring to FIG. 3 of the drawing, there is illustrated a circuit diagram of the electrical operating and control means for motor 10, particularly showing the circuitry to the stator 20. Outside power line 60, shown as a 3 phase input line, enters a circuit breaker 62, wherein there may be not only the circuit breaker elements, but also fuses, lightning arrestors and other safety components. From the circuit breaker 62, three conductors 64 enter a tap changing double throw switch 66 wherein each line energizes one blade of a three blade switch. The tap changer may be a contactor incorporated in the circuit breaker assembly 62, or it may be a separate switch operable manually, or by a solenoid, or by a rotor speed responsive actuator. To start the motor from standstill under normal torque load, the switch 66 is positioned from a full open position until each blade or contact engages one of the contacts for leads 72A, 72B,and 72C, respectively, to convey A.C. potential to the end terminals on the respective coils forming windings 32, so that the entire coils are energized and the full impedance of each is effective. The A.C. amperage drawn by a given coil is determined by this impedance, and such current results in a rotating magnetic field of a given magnitude which will produce a given rotating torque effective to start the rotor turning and will accelerate the rotor. This is designated the "normal mode" for the motor.

If a higher torque is desired the tap changing switch 66 may be operated first to, disconnect the blades or contacts, from leads 72A, 72B and 72C, and cause contact to lines 74A, 74B and 74C which convey the A.C. potential to taps 76A, 76B and 76C, respectively of the coils forming the windings 32. The taps convey the A.C. potential to only a shortened portion of each of the coils, whereby a lesser coil impedance is effective and thus for the same A.C. line potential a substantially greater amperage energizes the windings 32, thereby increasing the magnetic flux in the rotating magnetic field and immediately increasing the torque on the rotor. In practice the torque has been increased from 2 to 3 fold depending on the tap location. This is designated the "acceleration mode" for the motor.

The feedback windings 33 are connected to the excitation coil 38 through a capacitive circuit in which a lead 90 from a first terminal thereof is connected to a speed responsive switch and control unit 92, a lead 93 from the unit 92 is connected to one terminal of the excitation coil 38, and a lead 95 from the other terminal of the excitation coil 38 is connected to one terminal of the capacitor 94, while a lead 91 connects the second terminal feedback winding 33 to the other terminal of the capacitor 94. For certain applications the capacitor 94 may be connected between lead 91 and lead 93, as shown in dotted lines, therefore in parallel with the excition coil 38 and feedback winding 33. The feedback winding 33 is shown schematically as being located in slots generally diametrically opposite the excitation coil 38. However in practice the physical location of the feedback winding may be in other slots and such selected location is a function of the particular design and application of the motor.

The operation of the excitation circuit is as follows: When the speed of the rotor reaches roughly 75-80% of its synchronous speed, the speed responsive switch 92 operates to close the circuit from lead 90 to lead 93 and an A.C. potential from the feedback winding is immediately carried to the excitation coil 38, the circuit is completed by leads 91 and 95 to the terminals of capacitor 94. A.C. is also generated in the excitation coil 38 by the magnetic poles in the revolving rotor by reason of the magnetic fields in the rotor, such as in layer 52, and the rotating magnetic field of the stator. The resonant circuit combines these several A.C. potentials so that a single phase A.C. current of selected magnitude and phase flows through the excitation coil 38 and produces a strong alternating magnetizing flux at the face 36 of the pole piece 34 so that selected portions of the magnetic layer 52 are magnetized essentially to a saturation level into a pattern of strong north and south magnetic poles. These magnetic poles in layer 52 react strongly with the rotating magnetic field to cause a substantial increase in torque. The rotor will quickly, yet smoothly, increase in speed so that synchronous speed is attained, and full load on the rotor can be applied without any difficulty.

Therefore, the motor of this invention can be started in either the normal mode or the acceleration mode, or by applying these modes in sequence, up to the point where roughly 75-80% synchronous speed is reached, and then the excitation coil is energized to cause the rotor to continue to accelerate in either mode as desired, at high torque to synchronous speed.

When the speed responsive switch 92 closes the resonant circuit to the excitation coil, it may be desirable in some applications, to concurrently operate the tap changing switch 66 to cause the A.C. power in lines 64 to energize the complete windings 33, therefore means such as a solenoid, energized and controlled from switch 92, are energized as the 2700-2900 RPM point is reached, for a 2 pole 60 Hz motor, and the switch 66 then is positioned so that line A.C. power goes only to leads 72A, 72B and 72C and thus energizes the full windings 32. In any event, the tap changer switch 66 is caused to disconnect power to the low impedance windings and connect the full windings to A.C. line power when synchronous speed is reached.

It will be understood that the taps 76A, 76B and 76C and the tap changing switch 66 need not be present or used in the motor. They are provided primarily to enable the motor to accelerate a heavy or variable load. A particularly desirable use for the winding taps on windings 32 is at the time line voltage is interrupted and the motor starts to lose speed, say slowing down to 2900 to 3100 RPM (for a 2 pole 60 Hz motor) so that when A.C. line power returns it is conveyed to the taps 76A, 76B and 76C so that the rotor will acclerate back to synchronism even under brief over-load conditions.

Figure 4:
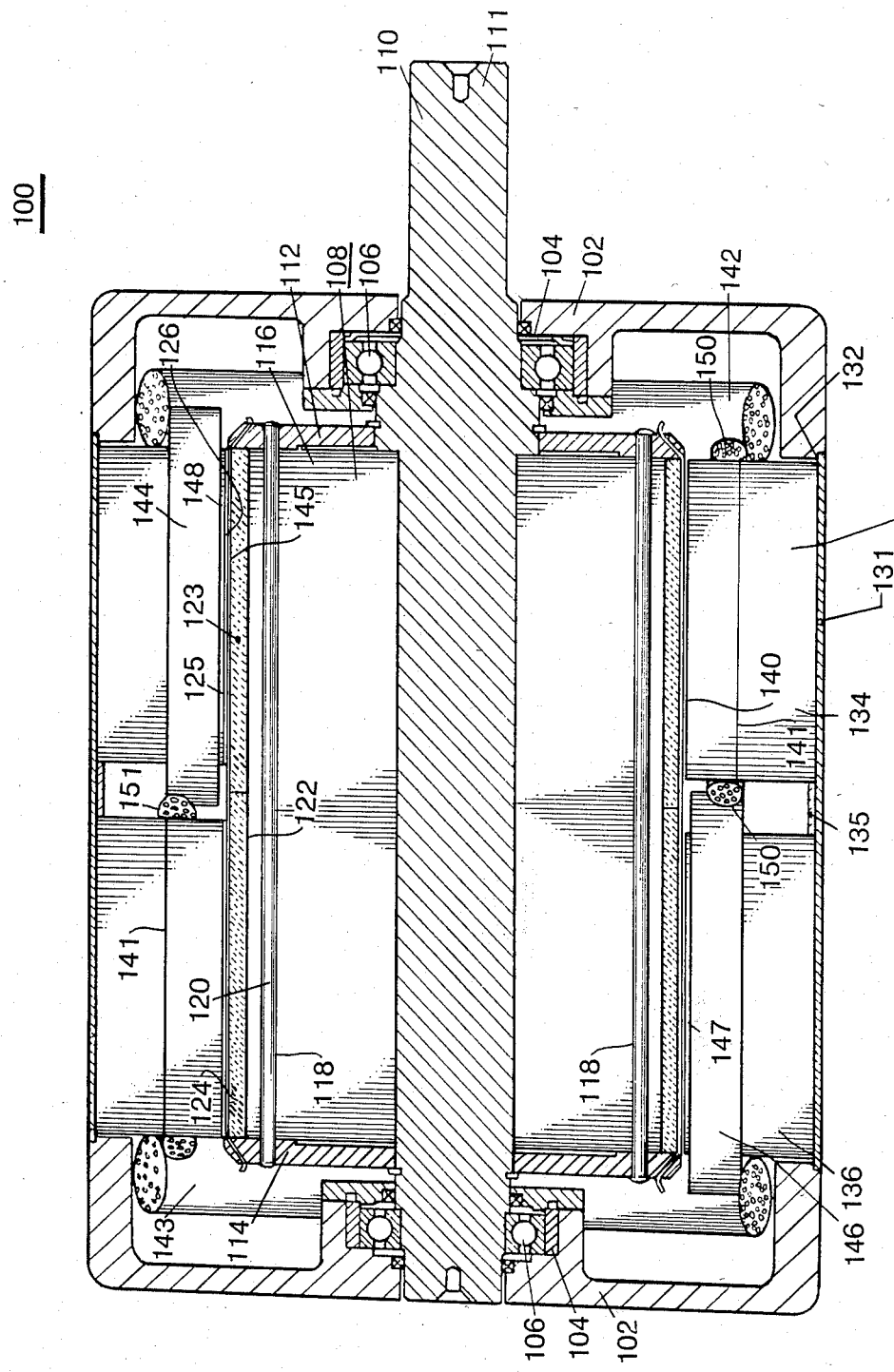
FIG. 4 is a radial cross-section of a low rotational inertia modification of the motor embodying this invention.

Referring to FIG. 4 of the drawing there is shown an axial cross section of a second configuration of a motor 100 embodying the invention. The motor 100 has a low rotational inertia structure similar to most usual electrical motors wherein the rotor has a relatively small outer diameter and is encircled by a larger outer stator. The motor 100 comprises end bells 102 each provided with centrally located bearing recesses 104 within which are located ball bearings 106 supporting a rotor 108 comprising a rotatable drive shaft 110 with a projecting external spindle 111 on which a drive pully or a gear can be mounted. Within the end bells 102, the rotor 108 comprises a right hand clamping plate 112 fixedly mounted on an enlarged boss on shaft 110 while a left hand clamping plate 114 is fixed at the opposite end of the shaft, as for example by a split spring washer or by a threaded nut applied to suitable threading at the left end of shaft 110. Firmly held between clamping plates 112 and 114 is a centrally apertured cylindrical stack 116 of laminations of soft magnetic material such for example as 3% silicon-iron, slidably but non-rotatably fixed to shaft 110. The stack 116 has a series of small holes 118 passing through the entire stack, the holes being arranged peripherally and generally parallel to the axis of the rotor about the entire circumference, but spaced from the outer cylindrical surface of the stack and within these holes are disposed uninsulated electrical conductors 120, with their ends projecting beyond the ends of stack 116 and electrically connected at their ends to the plates 112 and 114 whereby they are electrically shorted. The outer peripheries of both end plates 112 and 114 project beyound the outer periphery surface 122 of the stack 116 and between them are disposed a right hand layer 123 and a left hand layer 124, of a magnetizable permanent magnetic material, such as a ferrite, rigidly and firmly attached to the peripheral surface 122, using a strong adhesive such as an epoxy resin applied between surface 122 and the lower faces of layers 123 and 124. To assure the most reliable attachment to the stack 116 to avoid centrifugal forces disrupting the layers 123 and 124 from the surface 122, in high speed motors there can be applied a tight wrapping of glass or metal fibers of high electrical resistivity or other layers of material to form circumferentially restraining thin bands 125 and then a bond or adhesive may be applied to form a strong firm retaining means resisting centrifugal forces when the rotor revolves forming an outer cylindrical surface 126. Also, keystone shaped notches can be provided at surface 122 and complementarily shaped segments of ferrite material can be slipped in axially into the notches so as to provide a mechanical centrifugal-force resistant atachment. Whichever method of attachment is used it must accomodate the differences in thermal and mechanical properties between the permanent magnetic layer and the core. When completed, the rotor will exhibit an outer surface 126 of circular cylindrical configuration.

The stator 130 of motor 100 comprises an outer enclosing circular cylindrical shell 131 disposed in and firmly retained in notches 132 in the outer peripheries of end bells 102. A body of soft magnetic material comprising a right circular stack 134 and a left circular stack 136 of laminations of a soft magnetic material such as silicon-iron laminations separated by a spacer 135 is placed within the circular shell 131 and the assembly is rigidly clamped together and retained by bolts or the like. The interior surfaces 140 of the stacks 134 and 136 are of a circular configuration and are spaced to provide a rotational clearance with respect to the outer cylindrical surface 126 of the rotor. Slots 141 in each of the stacks 134 and 136 open at the surface 140 have power windings 142 and 143 disposed and arranged therein to provide a rotating magnetic field when energized with A.C. power. Two excitation coils are shown in this modification, though one continuous excitation coil may be used for certain applications on some motors having a short stator stack. A first excitation coil 144 functions to magnetize the layer 123 through the face 148 of its pole piece, while the other excitation coil 146, which may be located diametrically opposite or at other positions to achieve desired characteristics for certain applications, functions to magnetize the permanent magnetic material in layer 124 through the face 147 of its associated pole piece. In several of the slots 141 located in core stack 134 is located a feedback winding 150. Similarly in slots 141 in cores stack 136 is a feedback winding 151. Each of these slots may have some of the power windings also disposed therein. There are some advantages to be gained by arranging the plurality of excitation coils axially symmetrically about the rotor.

Figure 5:
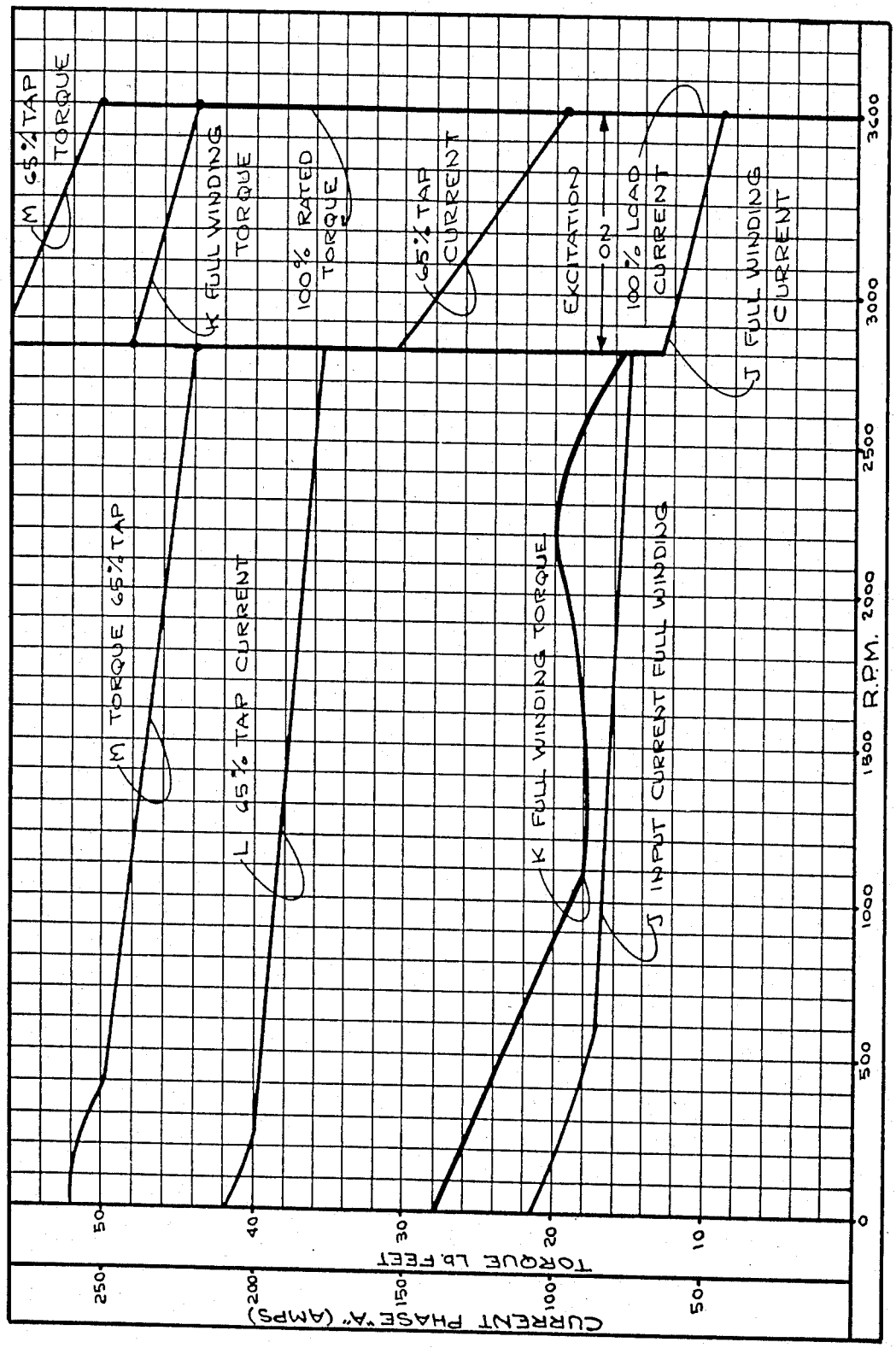
FIG. 5 is a graph plotting current and torque against speed in R.P.M. of a motor constructed in accordance with the invention.

Referring to FIG. 5 this is a graph on which are plotted curves of torques developed and amperes of current drawn by a motor constructed in accordance with this invention as the motor was accelerated from standstill to synchronous speed. The motor was energized with 60 Hz 3 phase A.C. at 230 volts. The motor was of 2 pole construction and had a nominal rating of 25 horsepower (18.7 KW). The construction was essentially that shown in FIG. 2.

When the motor was switched onto the power line in the normal mode with the full power windings being energized, as shown by Curve J, the initial current drawn was a maximum of about 106 amperes and it dropped slowly to a 76 ampere value by the time the rotor reached a speed of 2800 RPM. As evident from Curve K the motor starting torque was 28 lb-ft. which dropped slightly to about 19 lb-ft. at the 1000 RPM speed, then the torque first rose and then fell moderately to about 14.5 lb-ft. at the 2800 RPM speed point. At 2800 RPM speed, the excitation coil was energized with single phase A.C. and the line current drawn immediately dropped to 66 amperes while the torque value rose to an initial peak of about 48 lb-ft., as shown in curve K, and as the rotor speed increased the amperage and torque values dropped almost linearly to values of about 46 amperes and 43.5 lb-ft. respectively at the point just before pulling into the synchronous speed of 3600 RPM. At synchronous speed the torque and input current assume the value required by the connected load. In all cases the motor easily and smoothly accelerated to its synchronous speed, even when carrying a substantial load. Even with the very high windage loss associated with this high inertia design, tests indicated that the efficiency of the motor was 91% at the 25 horsepower output level, and the efficiency decreased only very slightly to 89% at 15 horsepower output and 79% when only 7.5 horsepower output load was being applied. For many electrical motors, substantial load output decreases of these proportions usually drastically reduce the efficiency, often to below 60-70%.

The test motor used in FIG. 5 was also energized in an "acceleration" mode, by providing a tap to the stator power windings at a point where only about 65% of the full windings were energized so that the impedance was about 50% of the impedance of the full windings. As shown by curve L, the initial amperage drawn was about 210 and as shown in curve M, the initial torque was about 52 lb-ft. The torque dropped steadily to 44 lb-ft. at 2800 RPM while the current being drawn dropped to 178 amperes. At 2800 RPM the excitation coil was energized and the torque increased to over 60 lb-ft. and the current dropped to 96 amperes just before the synchronous speed of 3600 RPM was reached.

The test motor was started repeatedly and accelerated in both the normal mode and acceleration mode to the 2800 RPM speed, then the excitation coil was energized to cause the rotor to reach synchronous speed fully loaded, and then the line power was cut off to simulate a brief line power interruption, the motor being allowed to lose speed down to 3150 RPM, and lower, and at that point full A.C. power is restored. In each instance the motor restarted and accelerated smoothly under load, with no electrical surges, overheating, or other difficulties, and readily reached full synchronous speed each time. Another desirable and valuable characteristic of the motor of this invention is its quietness at all speeds. Noise levels of the 25 H.P. (18.7 KW) motor described are less than 70 db A at 1 meter.

Many varieties of magnetizable permanent magnetic material can be employed in the motor of this invention. The layer 52 of FIG. 2, for example, preferably is comprised of an electrically non-conducting permanent magnetic material such as a ferrite. Metallic permanent magnetic materials, such as the alnico alloys, can be employed, if they are fabricated in such a manner as by mixing the powdered material with a resinous binder, as to reduce eddy currents therein from the excitation flux to an acceptable level.

Figure 6:
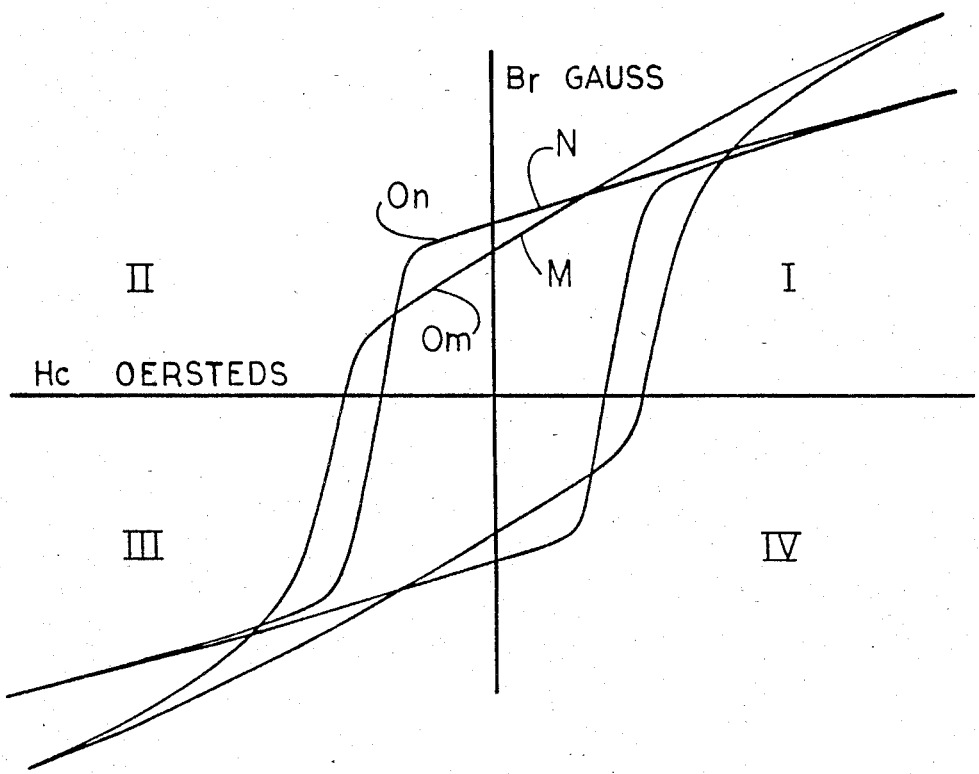
FIG. 6 is a graph plotting the hysteresis loop of two ferrite materials suitable for use in the rotors of the present invention.

Barium ferrites and barium strontium ferrites have given excellent results in the practice of this invention. Newer and improved types of ferrites and similar magnetizable permanent magnetic material are being developed and may be available in the future for use in producing the layers of permanent magnetic material such as layers 52 or 123 and 124 shown herein. The hysteresis curves of two ferrites that gave good results in motors are shown in FIG. 6. An oriented barium ferrite that has been commercially available for some years under the trade designation Grade 5 ferrite, was tested in a fixture representative of the magnetic paths in an actual motor by subjecting a 0.33 in. (0.84 cm.) thick sample to a hysteresis loop test wherein a magnetizing force was applied in one direction and then in the opposite direction and the field strength in gauss for the samples was plotted against oersteds of magnetizing force. Curve M shows the hysteresis loop for this sample. The closed circuit magnetic parameters for this material are Br of 4000 gauss and Hc of 2300 oersteds.

Another available ferrite designated as S 4109, was similarly tested and exhibited a much squarer and smaller hystersis loop N. Corresponding closed circuit properties are 4100 Br and 900 Hc. Even though this sample was 0.64 in. (1.63 cm.) thick, it required less magnetizing force to reach saturation than does the shorter length sample material of curve M. This indicates that a thicker layer of a material of types similar to S 4109 can be employed thereby reducing machine impedance and improving performance without increasing the excitation requirements. The second quadrant shapes of these curves are particularly important for the present motor applications. In the curve M the point Om is a typical working point in the second quadrant. The curve has a steeper slope at this point and a lower value in gauss as compared to point On, and therefore a thicker magnet can be used at the typical working point for material N. At point On material N has about 50% more magnetic strength in gauss than the material M at point Om; also because of the thicker magnet the slope of the curve On is flatter and gives better motor control properties than that of material M. The optimum thickness of the ferrite layer, 52 in FIG. 2, or 123 and 124 in FIG. 4, depends on the characteristics of the ferrite or other permanent magnetic material. Thus the ferrite M and other similar ferrites can be applied in layers of about 0.2 to 0.4 inch (0.5 to 1.0 cm) in thickness for motors up to 40 horsepower (30 KW) and thicknesses of about 0.3 to 0.5 inch (0.75 to 1.3 cm.) for higher rated motors, while the material of curve N could be used effectively in thicknesses of from about 0.5 to 0.7 inch (about 1.2 to 1.8 cm.) for 40 HP motors and up to 1 inch (2.54 cm) or more for larger motors. The relative permeability indicated by the slope of the curves M and N at the operating points ON and OM is essentially unity. The use of a thicker magnetic layer effectively increases the magnetic airgap seen by the field from the stator windings and reduces the machine impedance inversely proportionately. Thereby the use of a magnet material with characteristics illustrated by curve N allows the motor to accept more line current before excessive torque angles are reached and hence deliver significantly more torque from the same size machine.

The ferrite material N has produced outstanding results when enbodied for layer 52 in the motor as in FIG. 2, and these are due to the fact that the coercive force, Hc in oersteds, has a numerical value that is less than about 45% of the numerical value of the residual induction, $B_r$ in gauss, of the fully saturated material. Any other ferrite or magnetizable permanent magnetic material having similar properties would be eminently suitable for use in this novel synchronous motor.

Figure 7:
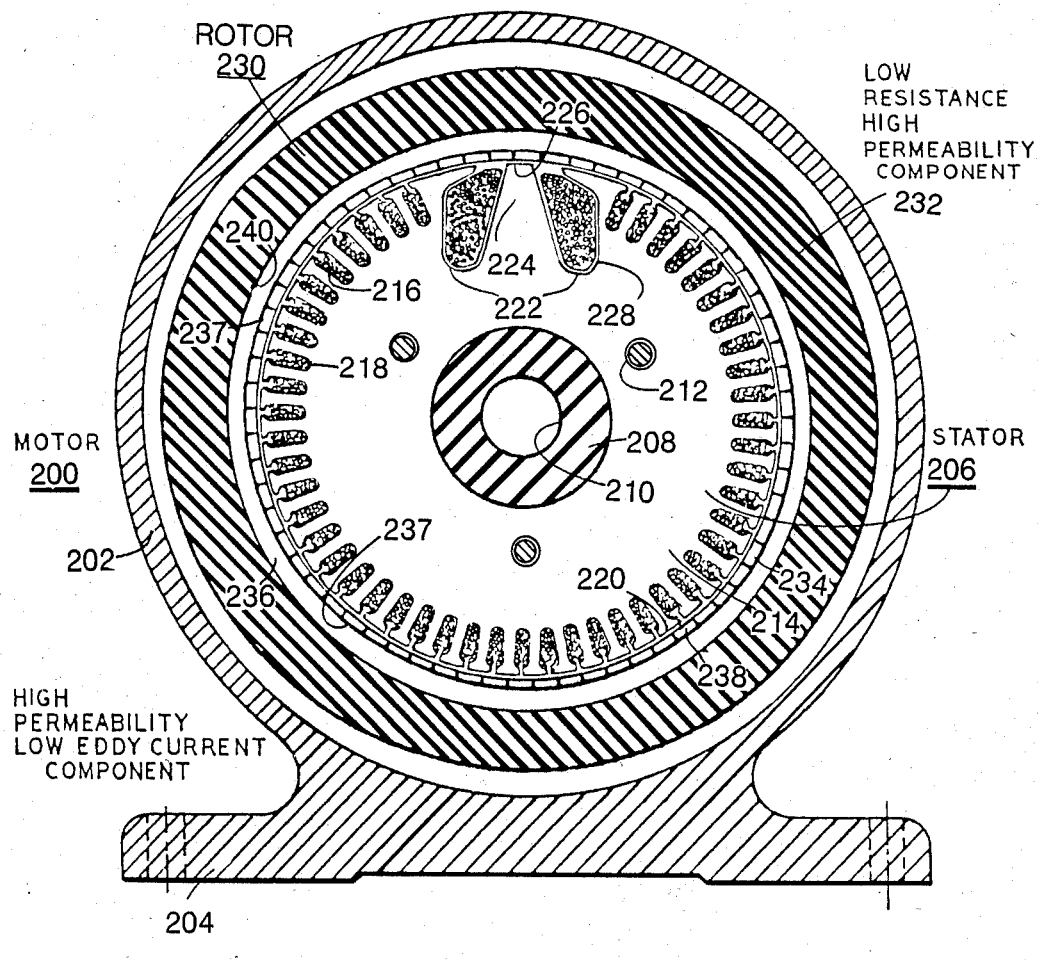
FIG. 7 is a vertical cross section through a modified form of the motor.

Referring to FIG. 7, there is shown a cross-section of another modification of the motor of this invention. The motor 200 comprises an outer suporting casing 202 with a mounting pedestal 204, and within the casing is supported a stator generally indicated as 206, comprising a supporting shaft 208 with a central bore or hollow 210 through which leads and control wiring for the stator can be introduced. Insulated bolts 212 retain a cylindrical slotted stack 214 of laminations of high permeability ferromagnetic material in fixed position on the shaft 208. Power winding 216 are disposed in relatively small slots 218 disposed about most of the periphery of core 214, having the outer cylindrical surface 220. Two larger slots 222 are located on either side of a pole piece 224 having a magnetizing tip or face 226, and in these slots 222 is disposed an excitation coil 228 which is in a suitable resonant circuit to enable it to be energized with single phase A.C. Feedback windings placed in selected slots 216 are connected to the resonant circuit so as to carry to the excitation coil a supplementing A.C. to modify the A.C. in the excitation coil in both phase and magnitude to enable it to magnetize the pole piece with alternating north and south pole magnetism to magnetize a permanent magnet layer to cause the motor to operate at suitable torque levels. The rotor 230 of motor 200 encircles and rotates about the stator 206, on bearings associated with the stator. The rotor 230 comprises three electrically and magnetically associated major components; 1. a layer 238 of a magnetizable permanent magnetic material, having a high coercive force and high electrical resistance; and having a surface 234 complementarily matching the surface 220 of the stator with a rotational clearance therebetween; 2. a cylindrical shell 236 of soft magnetic material exhibiting low eddy current losses, supporting the layer 238 on its one face 237 and providing a low reluctance path for the magnetic back flux in the layer 238; and 3. The other face 238 of shell component 240 is attached to the interior walls of a heavy cylindrical annular shell 232 of a ferromagnetic material having high permeability and good electrical conductivity, and having a selected electrical resistance to the flow of transverse electrical currents, soft steel being a suitable material therefor. The motor 200 will operate as does the motors such as shown in FIGS. 2 to 4 the drawings.

The motor of this invention is of great utility for many applications because of its novel properties, and its high electrical efficiency will be an important consideration for all uses and applications.

We claim:

1. A synchronous A.C. electrical motor comprising (A) a stator, bearings associated with the stator for supporting a rotor, the stator comprising a body of high permeability soft magnetic material arranged to have low eddy current losses, the body having a surface in the shape of a surface of revolution coaxial with the axis of the rotor, power windings energizable with input A.C. power disposed in the body adjacent to the surface of revolution to provide a rotating magnetic field about the axis when so energized, an excitation coil energizable with single phase A.C. disposed about a pole piece having a magnetizing face substantially at the surface of revolution, and (B) the rotor having three electrically and magnetically associated major components comprising (1) a first external layer of a high coercive force, low electrical conductivity magnetizable permanent magnetic material, the first layer having an exterior surface of revolution coextensive with and complementarily matching the surface of revolution of the stator with a rotational clearance space therebetween, (2) a second component upon which the first layer is placed in close contact to provide a low reluctance path for magnetic flux from the first layer, the second component comprising a body of high permeability material arranged to provide low eddy current losses therein, and (3) the third component closely physically associated with the second component and being spaced radially on the other side of the second component from the side on which the first layer is placed, the third component comprising a ferromagnetic material having high permeability and high electrical conductivity, and also having a selected high electrical resistance to the flow of transverse electrical currents, whereby during starting and at low rotor speeds the rotating magnetic field of the stator will generate transverse circulating electrical currents in the third ferromagnetic component that will react with the rotating magnetic field so as to apply a rotational torque to the rotor, and the selected high electrical resistance in the transverse direction in the third component providing for the inducing of relatively low amperage transverse currents in the component, and at higher speeds approaching synchronous speed, when the excitation coil is energized with A.C., the pole piece will be magnetized into successive strong north and south polarity and its magnetizing face will magnetize the first layer of permanent magnetic material into a controlled pattern of north and south magnetic poles that are at such a phase angle relative to the rotating magnetic field of the stator so as to produce a strong rotational torque capable of bringing the rotor up to synchronous speed.

2. The synchronous A.C. electrical motor of claim 1, wherein the second component of the rotor comprises an annular cylindrical stack of laminations of high permeability ferromagnetic material having one circular cylindrical face in contact with the first layer, and the third component comprises an adjacent stack of laminations in contact with the other circular cylindrical face of the annular cylindrical stack and a buried electrical conductor disposed in and in contact with the third component and transversely extending across the laminations and electrically shorted at the ends.

3. The synchronous A.C. electrical motor of claim 2, wherein the second component in the rotor comprises an annular stack of laminations of high permeability ferromagnetic material, and the third component comprises an adjacent circumferential portion of the same stack of laminations with a plurality of buried electrical conductors passing transversely through the stack and disposed to form a circular array spaced a radial distance away from the layer, the array of buried electrical conductors having a relatively high electrical resistance to the flow of transverse electrical currents so that electrical currents induced therein by the rotating magnetic field are low and thereby cause the stator power windings to draw only from about 2 to 4 times the amperage drawn when the rotor is is at synchronous speed and is pulling its rated load.

4. The synchronous A.C. electrical motor of claim 1, wherein the second component in the rotor comprises an annular cylindrical ring of a stack of laminations of high permeability ferromagnetic material having one circular cylindrical face in contact with the first layer, and the third component is a solid ring of ferromagnetic material having a selected resistivity to flow of circulating electrical currents that may be induced therein by the rotating magnetic field, and on which the other face of the stack of laminations is affixed.

5. The synchronous A.C. electrical motor of claim 1, wherein the stator comprises a slotted stack of laminations of high permeability ferromagnetic material and in the slots thereof are disposed (1) the power windings, (2) the excitation coil being disposed in two adjacent slots with an intervening portion of the ferromagnetic material forming the pole piece, and (3) feedback windings so placed in slots with respect to the slots with the excitation coil and the power windings, and with capacitative circuit means connected to the feedback windings and the excitation coil so that the electrical A.C. induced by the rotating magnetic field in both the feedback windings and the excitation coil is modified in phase and magnitude in the excitation coil to cause the magnetization pattern in the layer of permanent magnetic material to provide a desired high torque by reaction with the rotating magnetic field.

6. The synchronous A.C. electrical motor of claim 1, wherein the rotor is in the form of a circular cylinderical shell enclosing the stator to provide high rotational inertia, with the third component being located at the inner surface portion of and affixed to the shell, and having the second component inside of and joined to the third component, and the first layer of permanent magnetic material disposed on the interior surface of the second component and having its exterior surface being an interior cylindrical surface, and having support means extending from the bearings to the outermost portion of the cylindrical shell.

7. The synchronous A.C. electrical motor of claim 1, wherein the stator comprises a slotted stack of laminations of a soft ferromagnetic material of high permeability, (1) power windings in the slots thereof, (2) the excitation coil being disposed in two adjacent slots with an intervening portion of the stack of ferromagnetic material forming the pole piece, and (3) feedback windings placed in slots in a position with respect to the slots with the excitation coil that upon passage of the rotating magnetic field to produce selected A.C. potentials in the feedback windings, and tap means on the power windings, and circuit means including capacitors connecting the excitation coil, the feedback windings, and the tap means to convey single phase A.C. power of a selected phase and magnitude to the excitation coil so that the phase and magnitude of the single phase A.C. in the excitation coil causes the pole piece to produce north and south polarity pattern that produces a selected magnetization pattern in the layer of permanent magnetic material to provide a desire high torque in the rotor by reaction with the rotating magnetic field.

8. The synchronous A.C. electrical motor of claim 1, wherein the power windings in the stator have taps for varying the number of turns to be energized by the input power A.C. to enable the current thereto to be changed in starting the rotor from standstill conditions and bringing it up to high speeds.

9. The synchronous A.C. electrical motor of claim 1, wherein the excitation circuit means includes speed responsive switching and control means to control the energization of the excitation coil by A.C. in response to a selected rotor speed.

10. The synchronous A.C. electrical motor of claim 9, wherein the switching and control means controlling the A.C. to the excitation coil, apply such A.C. in a phased relation to the A.C. power being supplied to the power windings so as to control and limit any hunting when the motor is revolving at synchronous speed.

11. The synchronous A.C. electrical motor of claim 1, wherein polyphase A.C. is supplied to the power windings in the stator, and there are disposed in slots in the body of soft magnetic material a number of excitation coils at least equal to the number of phases of the polyphase A.C., and such plurality of excitation coils are substantially symmetrically spaced about the circumference of the stator.

12. The synchronous A.C. electrical motor of claim 1, wherein the excitation coil is connected to selected portions of the power windings to provide A.C. potential of a selected phase and magnitude to optimize the magnetization pattern of the layer of permanent magenetic material.

13. The synchronous A.C. electrical motor of claim 1, wherein the excitation coil is energized with single phase A.C. from the A.C. power source.

14. The synchronous A.C. electrical motor of claim 1, wherein the first layer of the rotor comprises a permanent magnet material having a coercive force, Hc (Oersteds) that is less than about 45% of the numerical value of the residual induction, Br (Gauss) of the fully saturated material.

15. The synchronous A.C. electrical motor of claim 14, wherein the permanent magnet material used is a permanent magnet ferrite.

* * * * *